Figure 1:
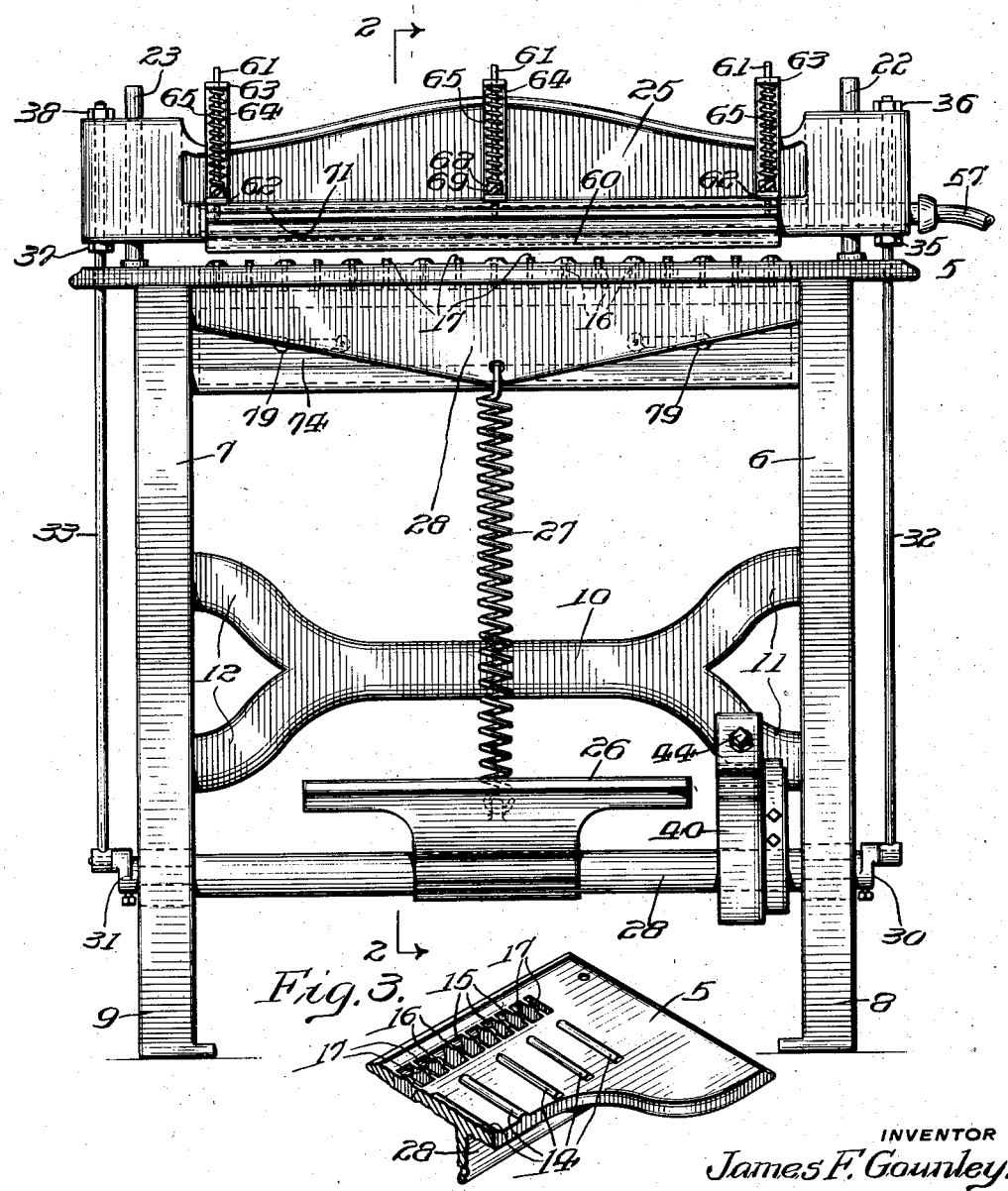

J. F. GOUNLEY.
MACHINE FOR STOPPING OUT PORTIONS OF ELECTROTYPE MOLDS.
APPLICATION FILED JUNE 24, 1912.

1,049,701.

Patented Jan. 7, 1913.

2 SHEETS—SHEET 1.

INVENTOR
James F. Gounley.

WITNESSES

BY

ATTORNEY

J. F. GOUNLEY.
MACHINE FOR STOPPING OUT PORTIONS OF ELECTROTYPE MOLDS.
APPLICATION FILED JUNE 24, 1912.

1,049,701.

Patented Jan. 7, 1913.

2 SHEETS—SHEET 2.

INVENTOR
James F. Gounley.

WITNESSES

BY

ATTORNEY

UNITED STATES PATENT OFFICE.

JAMES F. GOUNLEY, OF PHILADELPHIA, PENNSYLVANIA, ASSIGNOR TO ROYAL ELECTROTYPE COMPANY, A CORPORATION OF PENNSYLVANIA.

MACHINE FOR STOPPING OUT PORTIONS OF ELECTROTYPE-MOLDS.

1,049,701. Specification of Letters Patent. Patented Jan. 7, 1913.

Application filed June 24, 1912. Serial No. 705,497.

*To all whom it may concern:*

Be it known that I, JAMES F. GOUNLEY, a citizen of the United States, and a resident of Philadelphia, county of Philadelphia, State of Pennsylvania, have invented certain new and useful Improvements in Machines for Stopping Out Portions of Electrotype-Molds, whereof the following is a specification, reference being had to the accompanying drawings.

This invention particularly relates to devices employed for destroying the electrically conductive surface of the margins of electrotype molds or matrices, to confine the electroplate deposit to the impressed or working portion of said mold, and to so much of the surrounding margin as may be required or desired.

In the art of electroplating, various methods have been proposed for destroying the electrically conductive surface of the margin surrounding the impressed or working portion of the mold or matrix, the most common of which is to "iron" said surface by causing a hot tool to traverse a path surrounding said impressed portion; the so-called "ironing" process is not only laborious, but slow and expensive, as it requires a skilled operator to effect the "ironing" operation, for it is obvious that such tool, if too hot, or if not carefully manipulated, and especially if the mold be not perfectly dry, will cause the wax to splutter and splash over the impressed or working surface of the mold or matrix, and thereby render the entire mold worthless.

The principal object of this invention is to provide a machine so organized and constructed as to efficiently and economically render the surface surrounding the impressed or working portion of an electrotype mold or matrix non-conductive.

Other objects of this invention are to provide a machine with means to impress the surface of an electrotype mold or matrix with a heated tool, to render a portion of a predetermined width non-conductive; to provide means disposed between said tool and the impressed portion of said mold to prevent splashing of the wax upon said impressed portion; and to provide means to collect the drippings of melted wax.

Further objects of this invention are to provide a machine that will effect the "stopping out" or destruction of a predetermined portion of the surface of an electrotype mold or matrix in a uniform regular or selected contour, and to provide means which may be employed with efficiency for "stopping out" portions of the surface of an electrotype mold, while wet.

This invention also includes the method of "stopping out," or rendering selected portions of the surface of the electrotype mold non-conductive, which consists in impressing the surface which it is desired to destroy, by a heated tool moved toward and away from the surface of the mold in a direction substantially normal to the plane of said surface.

Specifically stated, this invention comprehends a ridged table for supporting electrotype molds or matrices having perforations subjacent to an "ironing" tool which is mounted for reciprocation normal to the surface of said table or support, and which carries a relatively yielding blade disposed to travel in advance of said tool, and to engage the surface of the mold or matrix, to be arrested thereby and so held during the engagement of said tool with that portion of the surface of the mold which is to be destroyed or rendered non-conductive, whereby any tendency of the wax melted by said tool to splash upon the impressed or working portion of the mold is prevented.

This invention further includes all of the various novel features of construction and arrangement hereinafter more definitely specified.

Figure 2:
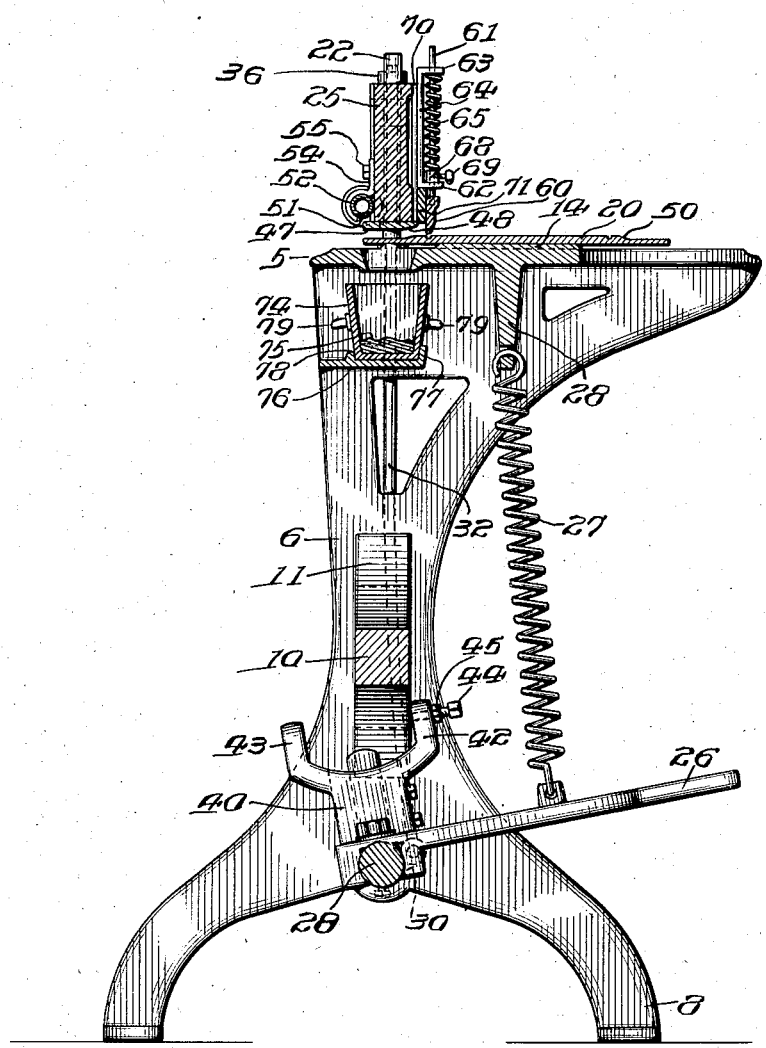

In the accompanying drawings, Figure 1 is a front elevational view of a "stopping out" machine constructed in accordance with this invention; Fig. 2 is a transverse vertical sectional view of said machine taken on the line 2—2 in Fig. 1, the foot treadle being shown in elevation for convenience of illustration; and Fig. 3 is a fragmentary perspective view showing the right hand end of the supporting table.

In said figures, the table comprises the bed plate 5 supported by the standards 6 and 7 respectively having feet 8 and 9, said standards being connected by the brace bar 10 whose respectively opposite ends are bifurcated to form the separated arms 11 and 12, respectively secured to, and connecting the standards 6 and 7 as best shown in Fig. 1.

As best shown in Fig. 3, the bed-plate 5 is provided with suitably spaced ridges 14, and a series of perforations 15 having interposed webs 16 which are each provided with a rounded upper edge 17 extending tangent to the horizontal plane of the crest of the ridges 14 for supporting the electrotype mold or matrix 20, as shown in Fig. 2. The bed-plate 5 is provided with upwardly projecting cylindrical posts 22 and 23 which extend through, and form guides for the yoke bar or cross-head 25 which is mounted thereon for vertical reciprocation in a direction normal to the plane of the bed-plate 5, said reciprocation is conveniently effected by the foot treadle 26 which is normally upheld in its inoperative position by the spring 27 which is attached to the strengthening web 28, depending from the lower side of the bed-plate 5. The treadle 26 is suitably mounted on the rock shaft 28, which is journaled in suitable bearings in the standards 6 and 7, and which is provided at its respectively opposite ends with the rocker arms 30 and 31, respectively connected by the pitmen 32 and 33 with the opposite ends of the yoke bar or cross-head 25, the pitman 32 being adjustably secured to said cross-head 25 by the adjusting nuts 35 and 36, and the pitman 33 being connected with said cross-head 25 by the adjusting nuts 37 and 38. The movement of the foot treadle 26 and consequently the throw of the cross-head 25, is limited by the lever 40 which is carried by the rock shaft 28 and which has its free end bifurcated to form the arms 42 and 43, embracing the brace bar 10. One or both of said arms 42 and 43 may be provided with an adjusting screw 44 in threaded engagement with the arm, and said screw may be conveniently held in set position by the lock nut 45, to engage the cross bar 10 as best shown in Fig. 2, and be adjustable to vary the movement of said treadle 26 and the cross-head 25 connected therewith. The cross-head 25 conveniently carries the "stopping out" tool 47 which preferably has its end working face 48 curved upwardly toward its forward edge, as shown in Fig. 2 to form the beveled surface 50 on the mold 20. Said "stopping out" tool 47 is arranged to be heated by jets of gas 51 directed to impinge upon its upper surface adjacent to its rear edge, as shown in Fig. 2, said jets being directed from the gas burner pipe 52 which is suitably supported on the cross-head 25 by the straps 54 conveniently secured thereto by tap bolts 55. As shown in Fig. 1, said pipe 52 may be connected with any suitable source of supply by the flexible tube connector 57.

Although the heating device herein shown and described, comprises means for directing jets of flame upon the "stopping out" tool, it is to be understood that it is not desired to limit the invention to such construction, but is to be construed to include heating said "stopping out" tool by hot air, hot water, or electrical means.

The yoke bar 25 also carries the shielding blade 60, which is carried with, but movable with respect to the "stopping out" tool 47, being provided with suitable parallel stems 61, which are yieldingly supported in suitable bearings 62 and 63 in the frames 64 by the springs 65, said stems 61 being mounted for reciprocation in said bearings and normally thrust downwardly by said spring, and limited in their downward movement by the collar 68 having the adjustable set screw 69. The frames 64 are preferably insulated from the cross-head 25 by suitable asbestos pads 70 which also insulate said cross-head 25 from the guide bar 71 upon which the blade 60 slides.

It will be readily seen that as the cross-head 25 and the parts carried thereby are drawn downward by the foot treadle 26, as above described, the blade 60 is first engaged with the surface of the electrotype mold or matrix 20, and forms a suitable guard to protect the impressed portion of said mold from being splashed by the sputtering molten wax, due to the engagement of the heated "stopping out" tool 47 with the surface of the wax mold 20. Said blade 60 in its downward movement is arrested by the surface of the mold 20, and by its yielding connection with the cross-head 25 is held in contact with the mold 20, while the "stopping out" tool 47 is brought down into engagement with the surface of said mold to render non-conductive or destroy the selected portion of the electrically conductive face thereof.

It will be noted that the wax of the mold upon being melted flows through the perforations 15 in the bed plate 5, into the receptacle 74 provided therefor beneath said apertures 15. Said receptacle 74 is arranged to collect the molten drippings 75, and is supported upon a suitable shelf 76 having the ledge 77 and ridge 78 between which said receptacle 74 which is provided with suitable handles 79, is held.

It will be observed that while the machine above described is best adapted for rendering non-conductive or destroying the electrically conductive surface of the margin surrounding the impressed or working portion of an electrotype mold 20, it may be as readily adapted for "stopping out" other portions of said mold. Furthermore, the stopped out region will conform to the shape of the "stopping out" tool whereby a straight edged tool will form straight lines of demarcation between the conductive and non-conductive surfaces of the mold, and by suitably shaping the face of the "stopping out" tool, the electrotype mold may be provided with a beveled non-conductive surface as shown in Fig. 2.

It is not desired to limit this invention to the precise details of construction and arrangement herein set forth, as various modifications may be made therein without departing from the essential features of the invention as defined in the appended claims.

Having thus described my invention, I claim:

1. A machine of the class described, comprising a support for electrotype molds, a tool for destroying a portion of the surface of the mold, and means for shielding the remaining portion of said mold.

2. A machine of the class described, comprising a support for electrotype molds, a "stopping out" tool for destroying a portion of the surface of the mold, and a blade having a yielding movement with respect to said "stopping out" tool for shielding the remaining portion of the surface of said mold.

3. A machine of the class described, comprising a support for electrotype molds, a tool arranged to reciprocate in a direction substantially normal to the plane of said support for destroying a portion of the surface of the mold, and means carried with said tool, movable with respect thereto, for shielding the remaining portion of the surface of said mold.

4. A machine of the class described, comprising means for supporting an electrotype mold, a heated "stopping out" tool for destroying a portion of the surface of the mold, and means extending substantially parallel with said tool for shielding the remaining portion of the surface of said mold.

5. A machine of the class described, comprising means having a corrugated surface for supporting electrotype molds, a "stopping out" tool movable toward and away from said supporting means, for destroying a portion of the surface of the mold, and means carried with said tool, for shielding the remaining portion of the surface of said mold.

6. A machine of the class described, comprising a support for electrotype molds, and a "stopping out" tool movable toward and away from the surface of said support, for destroying a portion of the surface of the mold.

7. A machine of the class described, comprising a "stopping out" tool for destroying a portion of the surface of an electrotype mold, and means for shielding the remaining portion of the surface of said mold.

8. A machine of the class described, comprising a "stopping out" tool for destroying a portion of the surface of an electrotype mold, and a blade carried therewith for shielding the remaining portion of the surface of said mold.

9. A machine of the class described, comprising a support for electrotype molds, a reciprocatory cross-head, a tool carried by said cross-head for destroying a portion of the surface of said mold, and a shield yieldingly mounted on said cross-head, for engaging the surface of said mold and shielding the remaining portion of said surface.

10. A machine of the class described, comprising a support for electrotype molds, a tool for destroying a portion of the surface of said mold, means normally tending to support said tool in its inoperative position, and means to effect the movement of said tool into operative contact with the surface of said mold.

11. A machine of the class described, comprising a support for electrotype molds, a cross-head suitably mounted to reciprocate in a direction substantially normal to the plane of said support, a "stopping out" tool carried by said cross-head, for destroying a portion of the surface of said mold, means arranged to direct gas jets upon said tool, and means for shielding the remaining portion of the surface of said mold.

12. A machine of the class described, comprising a support for electrotype molds, a tool for destroying a portion of the surface of the mold, means for heating said tool, and means for shielding the remaining portion of the surface of said mold.

13. A machine of the class described, comprising a support for electrotype molds, a cross-head mounted to reciprocate in a direction substantially normal to the plane of said support, a "stopping out" tool carried by said cross-head, for destroying a selected portion of the mold, means for heating said tool, means for shielding the remaining surface of said mold from splashing of the wax rendered molten by said tool, and means for reciprocating said cross-head to effect the movement of said tool and shielding means into engagement with the surface of said mold.

14. A machine of the class described, comprising a support for electrotype molds, a cross-head mounted to reciprocate with respect to the surface of said support, guides for said cross-head, a "stopping out" tool carried by said cross-head for destroying a portion of the surface of the mold, means arranged to heat said tool, a blade carried by said cross-head, held yieldingly movable with respect thereto, for shielding the remaining portion of the surface of said mold, means connected to reciprocate said cross-head, and means operative to normally maintain said cross-head in its inoperative position.

15. A machine of the class described, comprising a perforated support for electrotype molds, a tool disposed over the perforations in said support, for destroying a portion of the surface of said mold, and means for collecting the surplus molten wax, produced by contact of said tool with said mold.

16. A machine of the class described, comprising a ridged support for electrotype molds, a tool for destroying a portion of the surface of the mold, means for heating said tool, means for raising and lowering said tool with respect to said support, means for shielding the remaining portion of said mold, and means for insulating the last mentioned means from said heated tool.

17. A machine of the class described, comprising a heated tool for destroying a portion of the surface of an electrotype mold, means for shielding the remaining portion of said mold, and means for insulating said shielding means from said heated tool.

18. A machine of the class described, comprising a heated tool for destroying a portion of the surface of an electrotype mold, means carried with said tool, for shielding the remaining portion of the surface of said mold, and means for insulating said shielding means from said heated tool.

19. A machine of the class described, comprising a heated tool for destroying a portion of the surface of an electrotype mold, means arranged to reciprocate said tool toward and away from the surface of said mold, and means carried with said tool, and having a portion arranged to travel in advance thereof for engaging said mold and shielding the remaining portion of the surface thereof.

20. A machine of the class described, comprising a support for electrotype molds, and having a series of apertures, a "stopping out" tool for destroying a portion of the surface of the mold, disposed above said aperture, means to effect the reciprocatory movement of said tool toward and away from the surface of said support, to engage said tool with the surface of said mold, and means disposed below said apertures for collecting the molten wax melted from said mold by said tool.

21. A machine of the class described, comprising a support for electrotype molds, and having a series of apertures, a "stopping out" tool for destroying a portion of the surface of the mold, disposed above said apertures, means to effect the reciprocatory movement of said tool toward and away from the surface of said support, to engage said tool with the surface of said mold, means disposed below said apertures for collecting the molten wax melted from said mold by said tool, and shielding means carried with said tool, and yieldingly supported, to be moved with respect thereto when engaged with said mold, for shielding the remaining portion of the surface of said mold.

22. A machine of the class described, comprising a support for electrotype molds, provided with series of apertures, a cross-head mounted to reciprocate toward and away from the surface of said support, a rock shaft, a foot treadle on said rock shaft, means connecting said cross-head with said shaft to effect its reciprocation in accordance with the movement of said treadle, a tool carried by said cross-head for destroying a portion of the surface of the mold, means arranged to heat said tool, a removable receptacle supported beneath said apertures for collecting the drippings of molten wax from said mold when engaged by said tool, a frame carried by said cross-head, insulating means disposed between said frame and cross-head, a blade yieldingly mounted to reciprocate in said frame, and means tending to yieldingly shift said blade toward the surface of said support and to project its edge in advance of said tool for shielding the remaining portion of the surface of said mold.

23. The method of "stopping out" portions of an electrotype mold, which consists in mechanically impressing said mold with a heated tool.

24. The method of "stopping out" portions of an electrotype mold, which consists in impressing said mold with a heated tool without dragging said tool over the surface of said mold.

25. The method of "stopping out" selected portions of an electrotype mold, which consists in impressing said mold with a heated tool, engaged and released therefrom by a movement in a direction substantially normal to the face of said mold.

26. A machine of the class described, comprising a support for electrotype molds, a "stopping-out" tool having a beveled edge movable toward and away from said support for rendering selected portions of said mold non-conductive, and means for effecting the movement of said tool.

27. A machine of the class described, comprising a support for electrotype molds, a "stopping-out" tool having a tapered edge, movable toward and away from said support for rendering selected portions of said mold non-conductive.

28. A machine of the class described, comprising a support for electrotype molds, a "stoppping-out" tool movable toward and away from said support for rendering selected portions of said mold non-conductive, and means for moving said tool.

In witness whereof, I have hereunto set my hand this 22nd day of June, 1912.

JAMES F. GOUNLEY.

Witnesses:
 ALEXANDER PARK,
 CLIFTON C. HALLOWELL.